United States Patent [19]

Daniel

[11] 4,241,382
[45] Dec. 23, 1980

[54] FIBER OPTICS ILLUMINATOR

[76] Inventor: Maurice Daniel, 550 Jaycox Rd., Avon Lake, Ohio 44012

[21] Appl. No.: 23,034

[22] Filed: Mar. 23, 1979

[51] Int. Cl.² .......................... F21V 7/04; F21V 7/09
[52] U.S. Cl. .................................... 362/32; 362/255; 362/300; 362/346; 362/350
[58] Field of Search ................. 362/32, 255, 300, 346, 362/350

[56] References Cited
U.S. PATENT DOCUMENTS 3,770,338  11/1973  Helmuth ........................... 362/32 X Primary Examiner—Stephen J. Lechert, Jr.
Attorney, Agent, or Firm—Sixbey, Friedman & Leedom

[57] ABSTRACT

A fiber optics illuminator is described consisting of a light bulb having a fiber optics coupler or coupling means integral with the bulb envelope. The bulb is provided with a combination of ellipsoidal and spherical mirrors which together direct all light emitted from the filament through a small optical window located at the rear of said coupler or coupling means. To facilitate trapping of the light in the optical fibers, the light is made to emerge from the optical window at angles equal to or less than the critical angle of the fibers. This invention is intended for use as a primary light source for most applications involving illumination wherein visible or infra-red or ultraviolet electromagnetic radiation is channeled by optical fibers to illuminate a specific environment.

26 Claims, 3 Drawing Figures

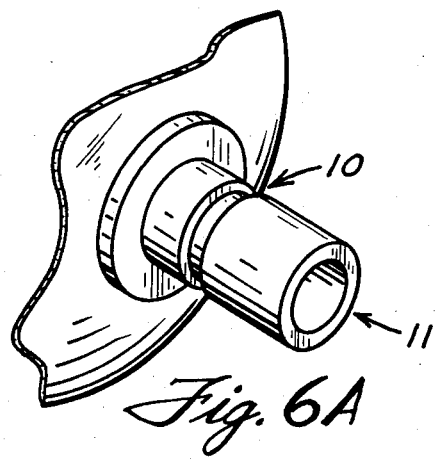
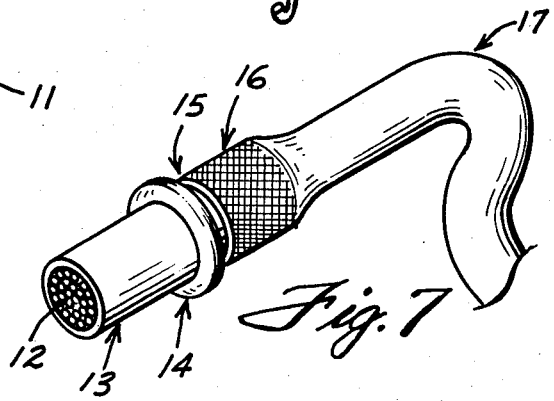
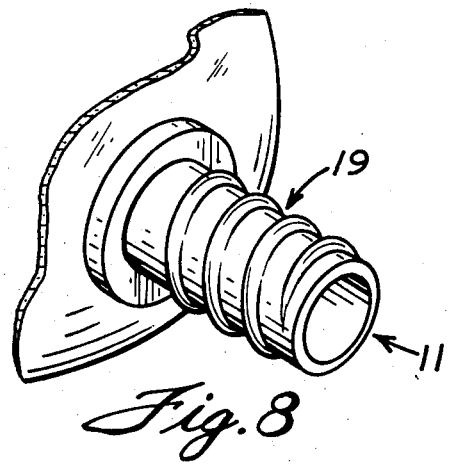
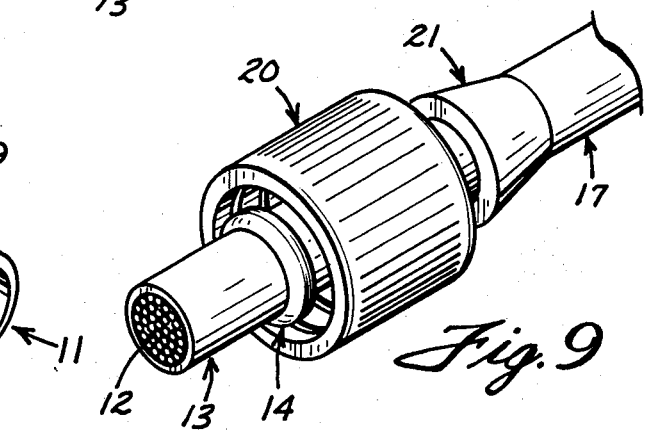
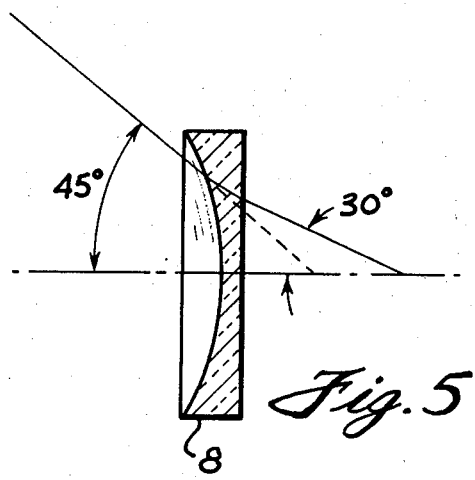
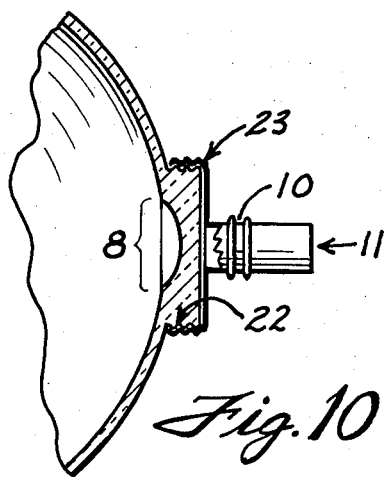

FIBER OPTICS ILLUMINATOR

FIELD OF THE INVENTION

The present invention relates to illuminators and more particularly to a light bulb assembly that includes a fully detachable fiber optics coupling means.

Fiber optics light pipes consisting of many strands of optical fibers bound together by a plastic sheathing into long flexable cables are in common usage in three broad classes of application: to conduct modulated light signals over long distances for communications, to conduct an optical image through unusual optical paths not possible by simple lens systems, and to conduct light for illumination to distant and/or inaccessible places. The present invention is directed towards this last class of applications. Specifically, this invention provides a practical and more efficient means of directing light into a light pipe than current methods.

Description of Prior Art

Presently fiber optics illumination is used in fiberscopes, in some microscope systems for the illumination of specimens and in other scientific instrumentation. Fiber optics designed to conduct ultraviolet light are employed to illuminate samples in applications involving fluorescence excitation, photochemical activation, and photobiological reactions. Increasingly, fiber optics illumination is being applied to automotive dashboard lighting and in control panel applications in general. In the consumer market, fiber optics are used for illumination in some unusual lamp designs and in a variety of other novelty items.

It is largely in anticipation of a greatly extended usage of optical fiber illumination in the near and distant future that this invention is directed. In particular, this invention supports the applications of optical fiber illumination made possible by the invention of light emitting fabrics described in a patent pending authored by myself. A light emitting fabric is a portion of cloth that is woven in part of lightly scratched optical fibers that are thereby able to emit light from its surface when the ends of the optical fibers are provided with a suitable source of illumination. Light emitting fabrics may be used to provide surface illumination of such diverse items as clothing for safety and recreation, home and automotive upholstery, advertising signs and displays, toys, strips used to illuminate hazardous projections or accent areas of interest, and the like. Light emitting fabrics may be used as a substrate in composite materials such as fiberglass, and thereby form the basis of rigid surfaces that emit light for use in such items as dashboards and control panels, appliance covers, machinery housings, boat hulls, and the like. The principal focus of this invention, however, is towards anticipated applications of fiber optics, and light emitting fabrics in particular, to the illumination of large scale architectural spaces by light emitting ceiling panels, wall coverings, drapery and the like.

The present methods of directing light from a filament or other light source into a light pipe are for the most part very inefficient. The method most often used is to employ a system of reflectors and lenses to focus a portion of the light output of a conventional light source, such as a light bulb, onto a polished end of a fiber optics light pipe. For the most part, these systems fail to capture the greater proportion of the light output and additional light is lost at each reflector surface and by each transmission through a lens.

The Quartzline lamp series manufactured by the General Electric Company, described in U.S. Pat. No. 3,314,331 and issued to E. H. Wiley, is one example of this method. It provides illumination for fiber optics light pipes by employing a tungsten-halogen bulb with a built-in elliptical condensing reflector to focus a portion of its light output on a point located some distance in front of the lamp. Because the reflector is internal to the bulb, this lamp and related apparatus represents one of the most successful lamp and reflector combinations for providing illumination of fiber optics now in common use.

However, these General Electric tungsten-halogen lamps require elaborate housings that include precise alignment for the lamp, fiber optics coupling devices, special electrical circuits to provide the correct lamp voltages, cooling fans, and shielding to protect eyes from light that is scattered away from the point of focus. The tungsten-halogen process used in these lamps is more efficient than the common variety of tungsten light bulb but these lamps are designed to serve primarily as general purpose photographic projection lamps which sacrifice much of their added efficiency so that they can be used in a variety of applications. When employed as a fiber optics illuminator, these General Electric Quartzline lamps prove complex and expensive to use and wasteful of a large portion of their light output.

A second method of directing light into the end of a light pipe is to simply place the end of a fiber optics light pipe as near as possible to a filament or other light source means. Two pertinent examples of this method are disclosed in U.S. Pat. No. 3,582,637 issued to John Cecil, Jr.; and U.S. Pat. No. 3,721,815 issued to Lamar J. Wall. However, as these applications demonstrate, all light generated by the filament that is not traveling directly towards the fiber ends is lost to productive use. U.S. Pat. No. 3,681,592 issued to Max Hugelshofer shows an improvement of this method whereby the light bulb is enclosed in a mirrored chamber to salvage a portion of the misdirected light. However, for the most part, the mirrors of this example simply focus the misdirected light back towards the filament instead of focusing it on the fiber ends.

In the three examples cited above, no care was taken to keep light which impinges on the fiber ends within the critical angle of the optical fibers. The critical angle requirement places a second limitation on the efficiency of this method since, as the fiber ends are brought close to the filament, a greater proportion of the impinging light will strike at angles greater than the critical angle and therefore not be trapped within the optical fibers.

The Cecil patent cited above attempts to increase the amount of light impinging on the fiber optics by employing a light bulb having a built-in convex lens that has the effect of reducing the angle of incidence of light striking the fiber optics. This lens causes the fiber optics to have an effective critical angle that is larger than the actual critical angle as approached from the direction of the filament which in turn allows a greater percentage of the light to be trapped within the optical fibers. However, this represents only a small gain in efficiency, which does nothing to offset the greater loss of light that is scattered out the sides and back of the lamp.

A third method of directing light into a light pipe is described in U.S. Pat. No. 3,581,140 issued to Raymond E. Paquette, U.S. Pat. No. 3,597,647 issued to Michael L. Rishton, and U.S. Pat. No. 3,770,338 issued to James G. Helmuth. This method consists of extending a transparent glass rod through the light bulb envelope to a point as close as possible to the filament or arc. The far end of the glass rod is made to extend for some distance away from the outside of the bulb envelope where it is more or less permanently affixed to the end of a fiber optics light pipe. In this configuration, the glass rod behaves as a large optical fiber that traps a portion of the light by internal reflections and directs it to the light pipe some distance away, thereby partially insulating the optical fibers from the high temperatures generated by the filament or arc.

However, this method suffers from the same disadvantages as the second method in that light not initially moving towards the face of the glass rod is lost to useful application as is light that enters the glass rod at angles greater than the critical angle of either the glass rod or the fiber optics. Additionally, in these three patents, the glass rod is either in intimate contact with or made a part of the bulb envelope so that any light initially trapped within the glass rod that later strikes the junction with the bulb envelope will either scatter into the outside air or be trapped inside the bulb envelope by internal reflections. In either case, light striking this junction area is lost to productive use along with light that is simply lost by absorbtion in transversing such a long length of glass. This method of inputting light into optical fibers is therefore seen to have a very low efficiency.

OBJECTS OF INVENTION

It is the principal objective of my invention to overcome the limitations of cost and efficiency exhibited by existing means of fiber optics illumination as cited above. Specifically, it is the objective of this invention to efficiently direct all the light generated by a filament or other means into the end of an attached fiber optics light pipe within the limitations of losses incurred by non-ideal optical components. In addition thereto, the objective is to keep all light striking the fiber ends within the critical angle of the optical fibers in order to ensure that all light entering the optical fibers is trapped therein. Another objective is to provide for the novel design of a fiber optics illuminator that does not scatter unproductive light into the surroundings, thus eliminating the need for external baffles and light-tight enclosures. A further object is to provide a unified design system including all components that are essential to the illumination of a fiber optics light pipe in a single, inexpensive, disposable device. Specifically, this invention includes a light source means, reflectors and other optical devices, an optical window, and a fiber optics coupler or the means thereof. Yet another objective is to provide a system of the above character that requires a minimum of supporting means, to wit: my invention may be applied to a specialized light bulb design that can be screwed into a standard lighting socket utilizing standard household A.C. voltages. An additional object is to provide a system of the above character that does not require critical positioning or alignment by its users.

The broader objective of this invention is to apply the teachings herein stated to a wide variety of applications that make use of fiber optics illumination. Specifically, one object is to provide a system of the above character capable of being applied to a wide variety of different light source means, including incandescent filament lamps, arc lamps, halogen lamps and the like. Another object is to provide a system of the above character that can be fitted with a wide variety of electrical socket means and optical coupling means. A further object is to provide a fiber optics illumination means that can be applied to a wide range of sizes, from small battery powered illuminators that can be concealed in suitable articals of clothing to large industrial illuminators designed to deliver hundreds of thousands of lumens of light output.

It is yet a further object of this invention to make possible the design of a more efficient infra-red illuminator for use as a source of infra-red radiation in applications that utilize infra-red conducting optical fibers. Likewise, an object of this invention is to make possible the design of a more efficient ultraviolet illuminator for use in conjunction with applications involving the use of ultraviolet illumination that is channeled by fiber optics means.

BRIEF DESCRIPTION OF THE DRAWINGS

FIG. 5 shows the passage of light through a diverging lens optical window.

FIG. 6A is an enlarged isometric view of a simple female fiber optics coupling device that is an integral part of a light bulb assembly.

FIG. 6B portrays a wire clip used to hold the coupler shown in FIG. 7 in place within the female coupler shown in FIG. 6A.

FIG. 7 is an enlarged isometric view of a simple male fiber optics coupler that is attached to the end of a multi-stranded fiber optics light pipe. This male coupler attaches to the female coupler shown in FIG. 6A.

FIG. 8 is an enlarged isometric view of a more complex female fiber optics coupling device that is an integral part of a light bulb assembly.

FIG. 9 is an enlarged isometric view of a more complex male fiber optics coupler that is attached to the end of a multi-stranded fiber optics light pipe and attaches to its female counter-part shown in FIG. 8.

FIG. 10 is a cross-sectional view of an optical window threaded on the outside and having an attached fiber optics adaptor.

GENERAL DESCRIPTION

Figure 1:
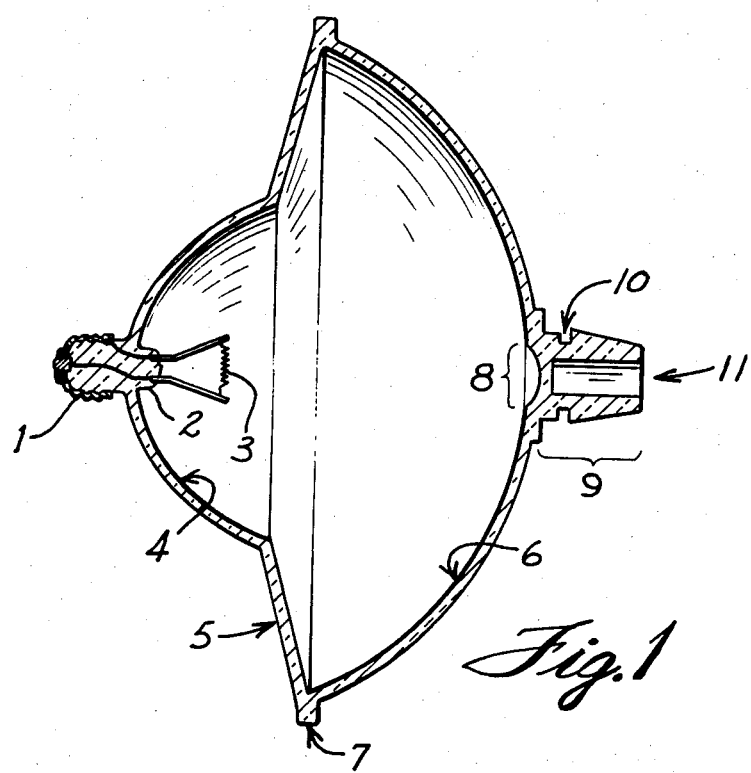
FIG. 1 depicts a cross-sectional view of the essential features of this invention including a fiber optics coupling device and mirror surfaces integral with light bulb means.
Figure 2:
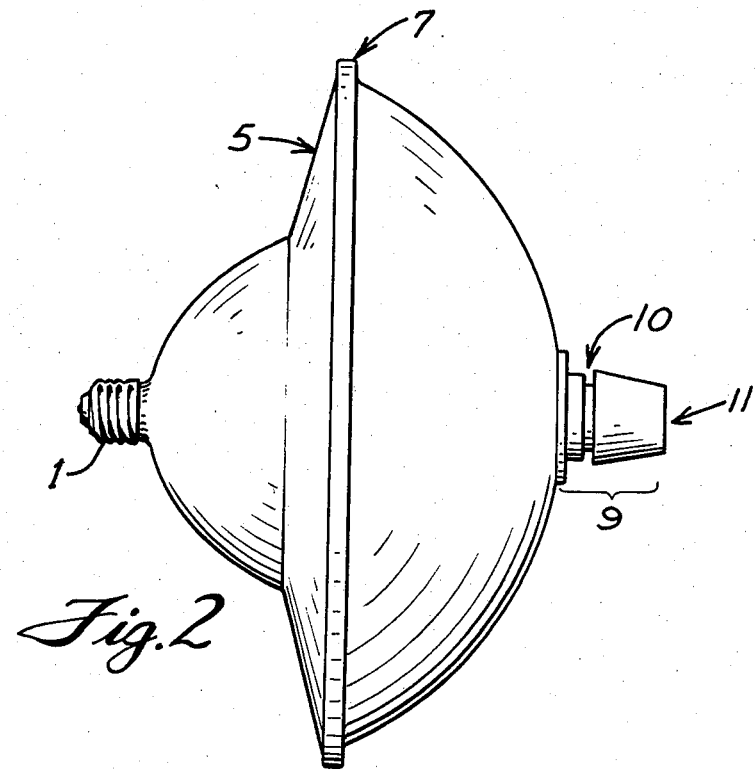
FIG. 2 is a side view of one possible embodiment of a fiber optics illuminator as described in this application.

FIG. 1 and FIG. 2 show the preferred embodiment of this invention including a male screw-in type electrical coupling means 1 that enables this bulb to be used in standard lighting fixtures using 115 volt alternating electric current. The filament 3 and its supporting structure 2 are of standard light bulb construction. In this embodiment, the bulb envelope is made of glass with reflective coatings on the ellipsoidal portion 4 and on the spherical portion 6. The combination of reflectors cause most of the light to pass through the optical window 8 which in this case is a lens. A simple fiber optics coupler 9 is an integral part of the bulb envelope having an entrance port 11 and a circumscribed groove 10 for use by wire clips or other means to keep the male, press-fit, fiber optics connector firmly in place when it is plugged into the bulb. A glass reinforcing ring circles the bulb at its widest diameter 7 for added strength and for the possible use as an attachment ring to some external lamp housing. The interior of the bulb may be evacuated or filled with special mixtures of gas according to usual engineering considerations.

DESCRIPTION OF REFLECTORS

The ideal fiber optics light source is one in which all the light rays produced by the filament or other means are focused onto the fiber optics ends at angles less than the critical angle for the particular optical fibers being used. In such an ideal system, no light is wasted. Light that initially travels in a direction away from the fiber optics ends is reflected by mirrored surfaces back towards the fiber optics ends. These reflectors also make certain that all light rays strike the end of the optical light pipe at an angle equal to or less than the critical angle of the optical fibers so that they are subsequently trapped within the optical fibers.

Figure 3:
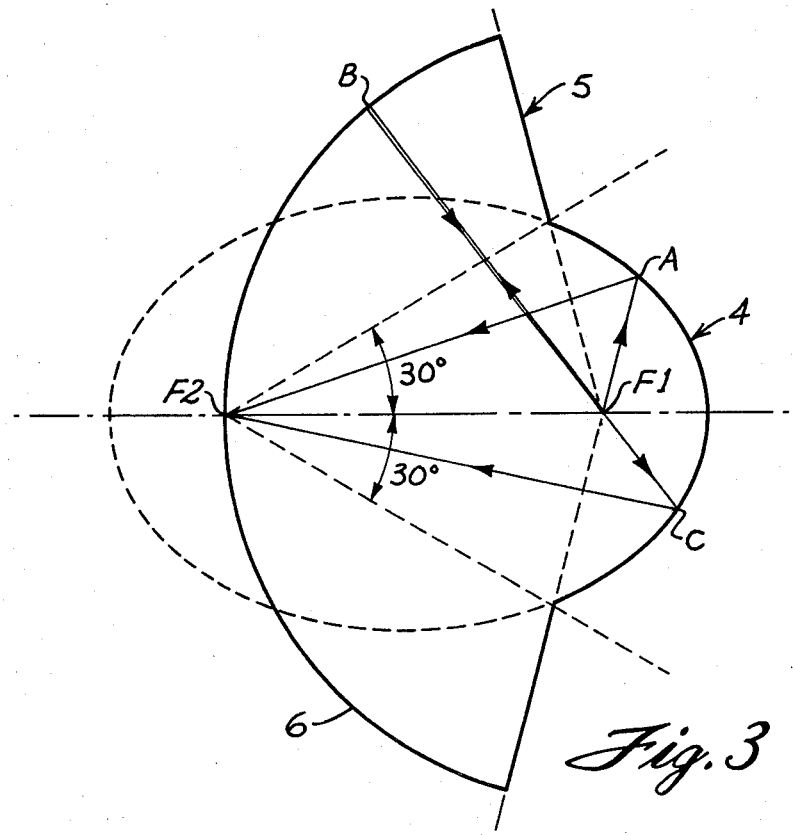
FIG. 3 illustrates one possible embodiment of the mirror geometry.

The preferred arrangement for this invention is shown in FIG. 3. The dark unbroken line shows the idealized cross-section for a light bulb designed for use as a fiber optics illuminator with a critical angle of 30°. The construction lines have been left in to clearly indicate the geometry. The light bulb envelope consists of three sections: a sperical segment 6, the frustum of a right cone 5, and a segment of an oblate spheroid 4. The spherical segment and the segment of oblate spheroid are made reflective to light on their inner surface. In this arrangement, the distance between the two foci, F1 and F2, is set exactly equal to the radius of the sphere. The filament or other means, considered as a point source of illumination, is located at F1 and the end of the fiber optics light pipe is located at F2.

The paths taken by two typical rays of light are illustrated in FIG. 3 by light unbroken lines. In the first example, the light ray leaves its source at F1, strikes the inner surface of the oblate spheroid at A and, because of the nature of such ellipsoidal reflectors, it is reflected directly to the second point of focus F2. In the second example, a light ray leaves its source at F1 traveling in the forward direction where it then encounters the spherical reflector at B. The spherical reflector reflects the light ray back to its source at F1 where, if not obstructed by the filament, it passes through the focus F1 and onto the oblate spheroid reflector at C where it is reflected a second time to the focus at F2. A small fraction of the light rays travel in the forward direction directly from F1 to F2. Thus it is seen that by this arrangement of reflectors all light rays leaving their source at F1 eventually end up at F2 and they all approach F2 at an angle of less than 30°.

Figure 4:
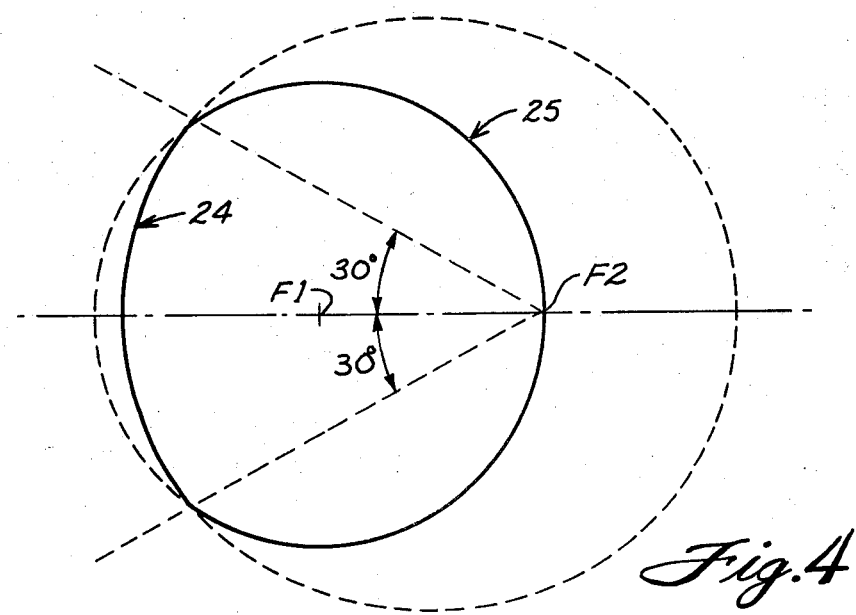
FIG. 4 illustrates a second possible embodiment of the mirror geometry.

A variation of the preferred arrangement of mirrors is shown in FIG. 4. In this arrangement the geometry of the ellipsoidal reflector is chosen so as to elliminate the need for a conical frustum between the spherical and ellipsoidal reflectors, thereby effecting a design simplification. This design also arranges the placement of the filament near the center of the bulb envelope which allows an overall reduction in size of the bulb with a resulting savings of materials. However, in this design most of the light emitted by the filament first strikes the spherical reflector and is therefore required to make two reflections before reaching the fiber optics window which is a loss of efficiency over the preferred configuration.

In practice not all of the light emitted by the filament or other means will reach the end of the fiber optics light pipe. Some optical losses occur at the mirrored surfaces and fiber optics window means. Light is also scattered into non-productive directions due to interference of the filament support structure, unfocusing effects of a filament that is not a point source and other geometric considerations.

A shadow affect caused by the filament itself causes some loss of light. Light which first strikes the spherical reflector is reflected back towards the filament where some of it is absorbed by the filament and thereby causes a shadow of the filament to be imaged on the fiber optics ends. In the preferred arrangement of this invention the spherical reflector is made of materials that reflect both visible light and infra-red radiation back towards the filament. The fraction of radiation that is subsequently re-absorbed by the filament goes into further raising its temperature and will thereafter be re-radiated in all directions as added heat and light. Thus, a major portion of the radiation that strikes the spherical reflector eventually ends up focused onto the fiber optics ends at F2 despite the shadow affect.

In most applications, it is desirous to illuminate the fiber optics ends with "cold" light, that is, electromagnetic radiation that has a maximum of visible light and a minimum of infra-red radiation. To help accomplish this in the preferred arrangement of this invention, the ellipsoidal reflector is a known type of multiple layer interference film deposited on a transparent glass envelope similar to that used in the General Electric Company's Quartzline reflector lamps. This interference film can be made highly reflective of visible light and highly transmissive of heat or infra-red radiation, thus allowing most heat to escape into the surroundings instead of being focused onto the fiber optic ends.

DESCRIPTION OF OPTICAL WINDOW

The optical window forms part of the bulb envelope and therefore helps to separate the vacuum or gas mixture on the inside of the bulb from the outside atmosphere. It is made of glass or other transparent means to allow light to be focused through the window and onto the fiber optics ends which are assumed to be near or in contact with the outside surface of the window. The reflectors are therefore arranged to direct the light to focus on the outside surface of the optical window. In the most simple case of this invention, wherein the bulb envelope is assumed to be made of glass, the window is simply a flat section of the glass envelope that lies between the bulb interior and the end of some fiber optics coupler.

In order to minimize the internal losses due to the shadow affect within the bulb, it is of obvious advantage to maximize the size of the ellipsoidal reflector in relation to the spherical reflector. One way to favorably affect this ratio and still keep the light reaching the fiber optics ends within the critical angle is to design the optical window as an optical lens; more specifically, a diverging optical lens 8 such as shown in FIG. 1. A diverging lens has the affect of allowing the reflectors to be designed according to an apparent critical angle which is larger than the actual critical angle. The relationship between apparent and actual critical angles is shown in FIG. 5 where, in this hypothetical example, the actual critical angle is 30° and the apparent critical angle is 45°. If the reflector design shown in FIG. 3 were re-designed for an apparent critical angle of 45°, the amount of light striking the ellipsoidal mirror can be increased by about 18% which represents a corresponding decrease in the shadow affect caused by the spherical reflector and an 18% decrease in the amount of light that must make two internal reflections before reaching the optical window which together represent a substantial improvement in overall efficiency for the bulb.

The use of a simple lens as an optical window results in some color separation due to diffraction effects in the light reaching the fiber optics light pipe, but for most lighting applications this is of little consequence since no optical images are involved.

It is also possible to arrange the reflectors and optical window lens to deliver light to the fiber optics at angles far less than the critical angles commonly encountered in optical fibers. For example, the illuminator could be designed to deliver its light at a critical angle of 15° or less. An illuminator of this design allows an attached optical light pipe to deliver light to its target with greater efficiency since light entering the optical fibers at smaller angles travels less distance and makes fewer internal reflections. The distance that light must travel within an optical fiber is inversely proportional to the cosine of the angle at which it enters the fiber. Therefore, light entering an optical fiber at a 15° angle travels 10.34% less distance to reach the opposite end of the fiber than light which enters the fiber at a 30° angle. Illuminators designed for a smaller critical angle are therefore able to significantly reduce the antennuation loss that takes place within an attached fiber optics light pipe.

DESCRIPTION OF FIBER OPTICS COUPLING MEANS

In the preferred embodiment of this invention, the fiber optics coupling means is made as an integral part of the bulb envelope and formed from the same substance as the rest of the bulb envelope. The preferred design for the optical coupler 9 is shown in FIG. 1 and FIG. 2 and an enlarged isometric view is shown in FIG. 6A. The corresponding male coupler is shown in FIG. 7. The optical fiber ends 12 are cut and polished to a flat face so that when the male shaft 13 is slid into the opening 11 the fiber ends just touch the optical window. The collar 14 prevents the shaft from being inserted too far into the female coupler and thereby prevents damage to the bulb. An enlarged portion of the shaft 16 is reinforced and coated with an easy-to-grip surface so that it can be held by the fingers without damage as the optical light pipe 17 is coupled or uncoupled from the bulb. A groove 10 on the female coupler and another groove 15 located on the male coupler allow a spring metal wire clip 18 to be snapped in place between the two grooved channels to hold the fiber optics light pipe firmly in place when the two couplers are mated.

A more complex arrangement of couplers is shown in FIG. 8 and FIG. 9 where a threaded cap 20 on the male coupler is threaded onto a threaded porition of the female coupler. An internal collar 14 located along the shaft 13 beneath the threaded cap 20 prevents the cap from being removed from the light pipe and provides a means for the cap to pull the light pipe firmly against the optical window. A second collar 21 prevents the threaded cap from sliding too far up the light pipe away from the coupler. This threaded cap arrangement eliminates the need for a wire slip, however its construction is more complex.

Many other optical coupler designs are possible. Unlike the optical couplers used in the communications industry, however, it is more important that optical couplers used for illumination be kept simple and inexpensive than it is for them to be the most efficient designs possible.

An alternate design for a practical and simple coupling means is illustrated in FIG. 10. Here the optical window is made of glass and protrudes from the bulb envelope with threads molded into the glass around its perimeter 22. Attached is a fiber optics adaptor that is spun from a single piece of thin metal and includes threads 23 which are subsequently screwed onto the threaded portion of the glass window. Glue or the like may be used to seal the adaptor in place. The female coupler end of the adaptor illustrated in FIG. 10 is made compatible to the male coupler illustrated in FIG. 7. Being made of metal, the adaptor/coupler combination illustrated in FIG. 10 is less subject to breakage than the couplers illustrated in FIG. 6 and FIG. 8. Furthermore, this type of coupling means offers greater design and user flexibility over the molded glass types illustrated previously. The manufacturer may offer a variety of different adaptor types to mate with press fit couplers, bayonet locking couplers, threaded sleave couplers and the like, to their customers by simply manufacturing the required threaded metal adaptor without having to change the design of their basic bulb envelopes. The threaded window design allows the user to remove the adaptor means from the bulb and use the light bulb for some other purpose such as attachment to a film projector or the like which has a suitable threaded socket means to receive the attachment of such a bulb design.

The adaptor/coupler design illustrated in FIG. 10 can be further simplified by the elimination of the threads 22 and 23 from both the metal adaptor and the glass window. In such a design, a press fit, glue, or the like is used as the means of attaching the cup-like end of the adaptor to the protruding optical window means. However, this arrangements lacks the flexability of the threaded design in that once assembled the user cannot replace the attached adaptor with one of a different type.

EXTENSIONS OF THIS INVENTION

Many other embodiments of this invention are possible by logical extension of the above teachings.

In place of the standard tungsten filament design described as the preferred embodiment of this invention, the basic lamp means may be a tungsten-halogen lamp, a mercury arc lamp, a sodium vapor lamp or any other means of producing light within a bulb envelope. Fiber optics illuminators may have a variety of different voltage and current requirements, and they may differ in their light outputs according to their design and intended use.

In lieu of the standard threaded lamp base 1, described above, a single contact bayonet base, a glass 2-pin base, or any other standard or non-standard lamp base may be substituted. A fiber optics illuminator may be constructed having more than one lamp base means.

Fiber optics illuminators may be manufactured having a plurality of filaments or other light source means within a single envelope positioned near the same or at different points of focus within the bulb. The filament or light source means may be enclosed in its own small glass or quartz envelope within the envelope having the reflector surfaces. In such a case, the filament envelope may contain a gaseous atmosphere or vacuum which differs from that of the reflector envelope.

It is not necessary that the filament support means 2 be attached to the back of the bulb as shown in FIG. 1; the support means may attach to any suitable position along the walls of the bulb.

For added strength, the bulb envelope may be made of metal instead of glass, quartz or the like. Cooling fins may be fabricated as part of the bulb envelope. Reinforcement collars, brackets, fins, struts and the like may be engineered as part of the bulb envelope for added strength and as attachment fixtures for external housings.

A fiber optics coupler or adaptor means may be manufactured in a separate operation and subsequently affixed to the bulb envelope by glue, rivits, welding or any other suitable means that leaves it as an integral part of the bulb. The coupler or adaptor may be constructed of different materials from the bulb envelope. Fiber optics illuminators may be designed with more than one fiber optics coupling or adaptor as an integral part of the bulb envelope. Illuminators may be constructed having a female or a male coupler means or both types may be made as part of illuminators having a multiplicity of couplers.

In addition to the flat and diverging lens optical windows mentioned above, the window may have the shape of a spherical lens, a converging lens, a Fresnel lens or the like. It may be made of glass, quartz, plastic, or other suitable materials. The optical window shown in FIG. 10 is made thicker than the rest of the bulb envelope for added strength; however, other variations are possible. The optical window may be a thin lens or flat section of transparent material surrounded by a lip that is threaded on the inside or outside for the attachment of an adaptor or fiber optics coupler means. Instead of being embedded in the same curved surface as the rest of the bulb envelope, the optical window may be made slightly protruding or recessed.

The optical window may have optical coatings applied to aid in the transmission of preferred frequencies of electromagnetic radiation while absorbing or reflecting others. The optical window may be made of colored glass, coated with colored transparent substances, or otherwise arranged to serve as a colored filter to the emerging light. The light entering the optical fibers may be colored by inserting thin colored filters between the optical window and the end of the inserted fiber optics coupler in most of the coupler arrangements described in this application. The attached fiber optics coupler may be suitably slotted to permit the insertion of the edge of an external color wheel which would thereby allow changing patterns of colored light to be transmitted through the fiber optics light pipe.

A drastic modification of the preferred reflector geometry may be necessary to accommodate some applications of this invention. A long narrow configuration may be best in applications where space is at a premium. Unusual space requirements; the addition of brackets, cooling fins, or the like; or other special design considerations may necessitate the elimination of part or most of the reflecting surfaces in some applications of this device. The teachings of this invention may be applied to a wide range of sizes from small battery powered illuminators to large commercial illuminators. The reflectors may be designed with more than two points of focus by suitably arranging a number of ellipsoidal and spherical reflecting surfaces within the same envelope to accommodate a plurality of light sources means and/or optical coupler means.

The optics, the light producing means, and other essential features of a fiber optics illuminator may be designed as a source of infra-red or ultraviolet radiation instead of visible light for use with fiber optics light pipes that are also designed for such wave lengths of the electromagnetic spectrum.

A fiber optics illuminator may be constructed utilizing any useful combination of the above teachings.

I claim:

1. A fiber optics illuminator including:
   (a) a source of illumination; and
   (b) an envelope means enclosing said source of illumination, said envelope means having an optical window means integrally formed therein for passing illumination from said source of illumination through said envelope means, said envelope means also having inner reflective surface means geometrically shaped to focus substantially all of the illumination from said source of illumination onto said optical window means.

2. A fiber optics illuminator as set forth in claim 1, wherein said inner reflective surface means is composed of a plurality of geometrically shaped sections joined together.

3. A fiber optics illuminator as set forth in claim 2, wherein said geometrically shaped sections include a first section in the form of a spherical reflector and a second section in the form of an ellipsoidal reflector.

4. A fiber optics illuminator as set forth in claim 3 wherein said spherical reflector section and said ellipsoidal reflector section are joined by a third section in the form of a right cone frustum.

5. A fiber optics illuminator as set forth in claim 4, wherein the radius of the spherical reflector is equal to the distance between the two foci of the ellipsoidal reflector.

6. A fiber optics illuminator as set forth in claim 5, wherein the source of illumination is positioned at the focus nearest the ellipsoidal reflector section and the optical window means is positioned at the focus farthest away from the ellipsoidal reflector section.

7. A fiber optics illuminator as set forth in claim 1, wherein said optical window means is transparent.

8. A fiber optics illuminator as set forth in claim 7, wherein said optical window means is an optical lens.

9. A fiber optics illuminator as set forth in claim 7, wherein said optical window means is a diverging optical lens.

10. A fiber optics illuminator se set forth in claim 1, including a fiber optics coupling means extending outwardly from said envelope means, said fiber optics coupling means operating to couple light transmitting means to said envelope means to receive illumination passing through said optical window means.

11. A fiber optics illuminator as set forth in claim 10, wherein said light transmitting means coupled to said envelope means includes a bundled plurality of optical fibers.

12. A fiber optics illuminator as set forth in claim 11, wherein one end of each optical fiber comprising said bundled plurality of optical fibers abuts said optical window means, each of said ends being cut and polished to provide a flat surface at the point of abutment.

13. A fiber optics illuminator as set forth in claim 12, wherein said inner reflective surface means is geometrically shaped to focus substantially all of the illumination from said source of illumination onto the outer surface of said optical window means at an angle less than the critical angle of the optical fibers comprising said bundled plurality of optical fibers.

14. The fiber optics illuminator as set forth in claim 12, wherein said inner reflective surface means is geometrically shaped to focus substantially all of the illumination from said source of illumination onto the outer surface of said optical window means at an angle of less than 30°.

15. The fiber optics illuminator as set forth in claim 12, wherein said inner reflective surface means is geometrically shaped to focus substantially all of the illumination from said source of illumination onto the outer surface of said optical window means at an angle of less than 15°.

16. A fiber optics illuminator as set forth in claim 12 wherein said fiber optic coupling means includes a hollow tubular projection extending outwardly from said optical window means and formed integrally therewith, said fiber optic coupling means also including a hollow tubular shaft means which encircles said bundled plurality of optical fibers and fits within said hollow tubular projection to bring the cut and polished ends of the optical fibers comprising said bundled plurality of optical fibers into abutment with said optical window means.

17. The fiber optics illuminator as set forth in claim 16, wherein a collar means is attached to said hollow tubular shaft means to prevent said hollow tubular shaft means from damaging said optical window means when said hollow tubular shaft means is inserted into said hollow tubular projection.

18. The fiber optics illuminator as set forth in claim 16, wherein a removable clamp means operates to lock said hollow tubular shaft means relative to said hollow tubular projection.

19. A fiber optics illuminator as set forth in claim 12, wherein said fiber optics coupling means includes an externally threaded hollow tubular projection extending outwardly from said optical window means and formed integrally therewith, said fiber optics coupling means also including an internally threaded cap means containing an internal shroud which encircles said bundled plurality of optical fibers, said internally threaded cap means operating to insert said internal shroud into said externally threaded hollow tubular projection to bring the cut and polished ends of the optical fibers comprising said bundled plurality of optical fibers into abutment with said optical window means whenever said internally threaded cap means is threaded onto said externally threaded hollow tubular projection.

20. The fiber optics illuminator as set forth in claim 19, wherein a collar means is attached to said internal shroud to prevent the internal shroud from damaging the optical window means when said internal shroud is inserted into said externally threaded hollow tubular projection.

21. A fiber optics illuminator as set forth in claim 11, wherein said fiber optics coupling means includes an externally threaded glass projection which extends outwardly from said optical window means and is integral therewith, said fiber optics coupling means also including an internally threaded fiber optics adaptor means to which said bundled plurality of optical fibers is attached, said fiber optics adapter means operating to bring said bundled plurality of optical fibers into contact with said externally threaded glass projection whenever said fiber optics adapter means is threaded onto said externally threaded glass projection.

22. A fiber optics illuminator as set forth in claim 1 wherein the interior of said envelope means is filled with gas.

23. A fiber optics illuminator as set forth in claim 1, wherein said source of illumination includes a tungsten filament.

24. A fiber optics illuminator as set forth in claim 1, wherein a threaded electrical connecting means protrudes from the outer surface of said envelope means and can be threaded into a conventional light bulb socket to transmit energy from a conventional electrical supply circuit to said source of illumination.

25. A fiber optics illuminator as set forth in claim 1, wherein cooling fins are formed on the outer surface of said envelope means.

26. A fiber optics illuminator including:
(a) a source of illumination which generates both visible light and infra-red radiation; and
(b) an envelope means enclosing said source of illumination, said envelope means having an optical window means integrally formed therein for passing visible light from said source of illumination through said envelope means, said envelope means also having an inner reflective surface means geometrically shaped to reflect substantially all of the visible light generated by said source of illumination toward a focal point located at said optical window means while simultaneously transmitting substantially all of the infra-red radiation generated by said source of illumination away from said focal point.

* * * * *